(12) United States Patent
Ahn et al.

(10) Patent No.: US 7,833,159 B2
(45) Date of Patent: Nov. 16, 2010

(54) IMAGE PROCESSING SYSTEM AND METHOD OF ENHANCING THE QUALITY OF AN ULTRASOUND IMAGE

(75) Inventors: Chi Young Ahn, Seoul (KR); Jong Beom Ra, Daejeon (KR); Yong Sun Kim, Daejeon (KR); Duhgoon Lee, Busan (KR)

(73) Assignees: Medison Co., Ltd., Hongchun-gun (KR); Korea Advanced Institue of Science and Technology, Daejeon (KR)

( * ) Notice: Subject to any disclaimer, the term of this patent is extended or adjusted under 35 U.S.C. 154(b) by 1028 days.

(21) Appl. No.: 11/562,672

(22) Filed: Nov. 22, 2006

(65) Prior Publication Data

US 2007/0165925 A1    Jul. 19, 2007

(30) Foreign Application Priority Data

Nov. 24, 2005    (KR) .................. 10-2005-0112815

(51) Int. Cl.
*A61B 8/00*    (2006.01)
*G06K 9/40*    (2006.01)
*G01N 29/04*    (2006.01)

(52) U.S. Cl. ............ 600/437; 600/443; 382/254; 73/631

(58) Field of Classification Search ........... 600/437, 600/443, 440; 73/631; 382/128, 254, 274
See application file for complete search history.

(56) References Cited

U.S. PATENT DOCUMENTS

| | | | |
|---|---|---|---|
| 4,852,576 | A | 8/1989 | Inbar et al. |
| 5,524,626 | A | 6/1996 | Liu |
| 6,398,733 | B1 * | 6/2002 | Simopoulos et al. ........ 600/443 |

FOREIGN PATENT DOCUMENTS

| | | |
|---|---|---|
| DE | 197 42 118 A1 | 4/1998 |
| EP | 0 544 328 A2 | 6/1993 |
| JP | 8-206112 | 8/1996 |
| JP | 2005-152422 | 6/2005 |
| WO | WO81/00807 | 4/1981 |

OTHER PUBLICATIONS

Alan W. Bryant, et al. "Adaptive Gain Control and Contrast Improvement for Medical Diagnostic Ultrasound B-Mode Imaging System Using Charge-Couples Devices", Circuits and Systems, XP-010063241, May 1991, pp. 685-687.

* cited by examiner

*Primary Examiner*—Eric F Winakur
*Assistant Examiner*—Katherine L Fernandez
(74) *Attorney, Agent, or Firm*—Oblon, Spivak, McClelland, Maier & Neustadt, L.L.P.

(57) ABSTRACT

The present invention relates to an image processing system for enhancing the image quality of an ultrasound image. The image processing system may include: an image data forming unit for forming image data based on image signals acquired from a target object; a log-compression unit for log-compressing the image data to provide a log-compressed image; a TGC processor for analyzing a vertical profile of pixel intensities in the log-compressed image and automatically setting a TGC (time gain compensation) parameter based on the analysis result; a gain processor for calculating mean brightness of pixels included in the log-compressed image applying the set TGC parameter and comparing the calculated mean brightness with predetermined brightness, thereby automatically setting a gain parameter based on a comparison result; a DR processor for automatically setting a DR (dynamic range) parameter by using edge contrast and background roughness of the log-compressed image applying the set TGC and gain parameters; and an image forming unit for applying the TGC, gain and DR parameters to the image data.

16 Claims, 5 Drawing Sheets

IMAGE PROCESSING SYSTEM AND METHOD OF ENHANCING THE QUALITY OF AN ULTRASOUND IMAGE

The present application claims priority from Korean Patent Application No. 10-2005-0112815 filed on Nov. 24, 2005, the subject matter of which is incorporated herein by reference.

BACKGROUND

1. Field of the Invention

The present invention generally relates to ultrasound image processing, and more particularly to an image processing system and a method of enhancing the quality of an ultrasound image.

2. Background of the Invention

An ultrasound diagnostic system has become an important and popular diagnostic tool since it has a wide range of applications. Specifically, due to its non-invasive and non-destructive nature, the ultrasound diagnostic system has been extensively used in the medical profession. Modern high-performance ultrasound diagnostic systems and techniques are commonly used to produce two or three-dimensional diagnostic images of internal features of an object (e.g., human organs).

The ultrasound diagnostic system generally uses a wide bandwidth transducer to transmit and receive ultrasound signals. The ultrasound diagnostic system forms images of human internal tissues by electrically exciting an acoustic transducer element or an array of acoustic transducer elements to generate ultrasound signals that travel into the body. The ultrasound signals produce ultrasound echo signals since they are reflected from body tissues, which appear as discontinuities to the propagating ultrasound signals. Various ultrasound echo signals return to the transducer element and are converted into electrical signals, which are amplified and processed to produce ultrasound data for an image of the tissues. The ultrasound diagnostic system is very important in the medical field since it provides physicians with real-time and high-resolution images of human internal features without the need for invasive observation techniques such as surgery.

In the ultrasound diagnostic system, an ultrasound image needs to be optimized to clearly show a desirable portion for accurate diagnosis. The ultrasound image can be optimized by adjusting the brightness and contrast of the ultrasound image with image parameters such as time gain compensation (TGC) parameter, gain parameter, reject parameter, dynamic range (DR) parameter and the like. A user needs to only slightly adjust the image parameters in order to obtain the desirable brightness and contrast of an ultrasound image in the conventional diagnostic system. However, since the slight adjustment of the image parameters is not conducted automatically but rather manually in the conventional ultrasound diagnostic system, an extensive amount of time is incurred to adjust the image parameters. Therefore, there is a problem in that the amount of time needed to complete diagnosis is extensively increased.

BRIEF DESCRIPTION OF THE DRAWINGS

The present invention may be described in detail with reference to the following drawings in which like reference numerals refer to like elements.

DETAILED DESCRIPTION

A detailed description may be provided with reference to the accompanying drawings. One of ordinary skill in the art may realize that the following description is illustrative only and is not in any way limiting. Other embodiments of the present invention may readily suggest themselves to such skilled persons having the benefit of this disclosure.

Figure 1:
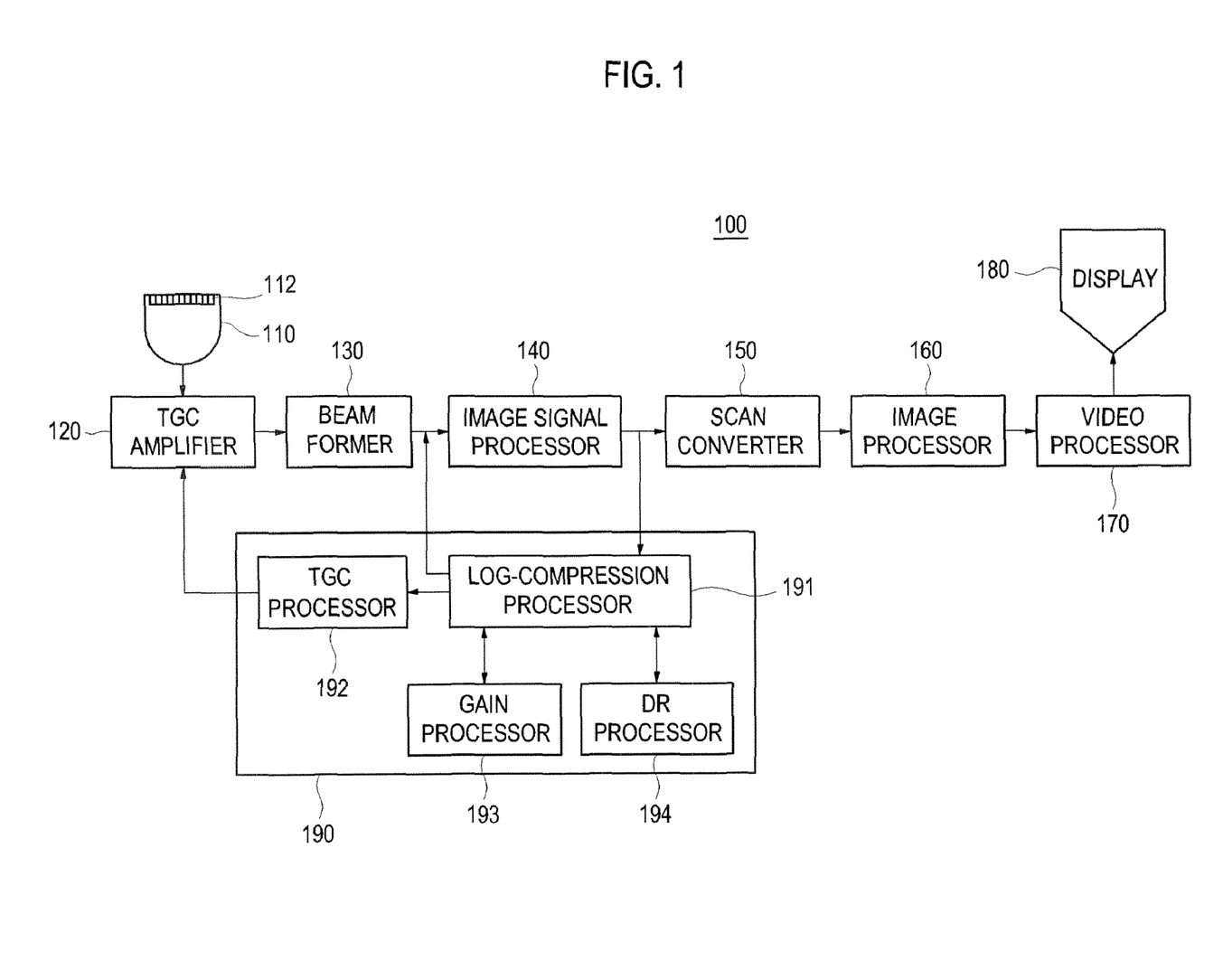
FIG. 1 is a block diagram illustrating an ultrasound diagnostic system constructed in accordance with an embodiment of the present invention.

FIG. 1 is a block diagram illustrating an ultrasound diagnostic system 100, which is constructed in accordance with an embodiment of the present invention. The ultrasound diagnostic system 100 of the present invention includes a probe 110, a time gain compensation (TGC) amplifier 120, a beam former 130, an image signal processor 140, a scan converter 150, an image processor 160, a video processor 170, a display unit 180 and an image parameter processor 190. The image signal processor 140, the image processor 160, the video processor 170 and the image parameter processor 190 may be provided as one processor.

The probe 110 includes a one-dimensional or a two-dimensional array transducer 112. The transmit signals, which are appropriately delayed in the beam former 130 to form an ultrasound beam, are transmitted to the array transducer 112. Then, the focused ultrasound beam, which is produced in response to the transmit signals, is transmitted along a scan line set in a target object (not shown). The probe 110 receives the ultrasound echo signals reflected from the target object and converts the ultrasound echo signals into electrical signals (hereinafter referred to as receive signals). The receive signals are transmitted to the beam former 130. The TGC amplifier 120 amplifies the receive signals with time to compensate for loss in echo amplitude with depth due to attenuation according to the TGC parameter.

The beam former 130 provides the delays of transmit signals to be transmitted to the array transducer 112 included in the probe 110 such that the ultrasound signals outputted from the array transducer 112 are focused on a focal point. Further, the beam former 130 focuses the receive signals, which are received from the array transducer 112 included in the probe 110, in consideration of the delays with which the echo signals are arrived at each transducer. It then outputs a focused receive beam representing the energy level of the ultrasound echo signal reflected from the focal point.

The image signal processor 140 (e.g., a digital signal processor (DSP)) performs envelop detection for detecting the intensities of the focused receive signals to form raw ultrasound image data. That is, the image signal processor 140 forms ultrasound image data based on the receive focused signals acquired from each focal point and position information of a plurality of focal points on each scan line. The ultrasound image data include the coordinate information of each focal point, the angle information of each scan line and the intensity information of the echo signals received at each focal point.

The scan converter 150 scan-converts the ultrasound image data to a data format capable of being displayed on a screen of the display unit 180. The image processor 150 performs image processing for the scan-converted ultrasound image data to obtain a B-mode image, M-mode Doppler image and the like.

The video processor 170 processes the ultrasound image data to be displayed on a screen of the display unit 180 and transmits the processed ultrasound image data to the display unit 180. The display unit 180 displays an ultrasound image such as the B-mode image, M-mode Doppler image or the like based on the ultrasound image data received from the video processor 170.

The image parameter processor 190 includes a log compression 191, a TGC processor 192, a gain processor 193 and a dynamic range (DR) processor 194. The log compression 191 log-compresses the ultrasound image data obtained by applying initial image parameters such as a TGC parameter, a gain parameter, a reject parameter, a DR parameter and the like. The dynamic range represents a range of amplitude of the image signals to be processed in the image signal processor 140. The contrast of the ultrasound image may be adjusted according to the DR parameter. The reject parameter represents a threshold of amplitude of the images to be rejected from the ultrasound image signals.

The TGC processor 192 adjusts the TGC parameter of a log-compressed ultrasound image to accurately compensate for the attenuation of ultrasound echo signals with depth. The gain processor 193 adjusts the gain parameter of the log compressed ultrasound image applying the TGC parameter adjusted in the TGC processor 192. If the gain parameter is adjusted, then the amplitude of the overall image signals is identically changed. This means that the reject parameter may be dependent upon the gain parameter. The DR processor 194 adjusts the DR parameter of the log-compressed ultrasound image applying the gain parameter adjusted in the gain processor 193 to thereby optimize the contrast of the ultrasound image.

Figure 2:
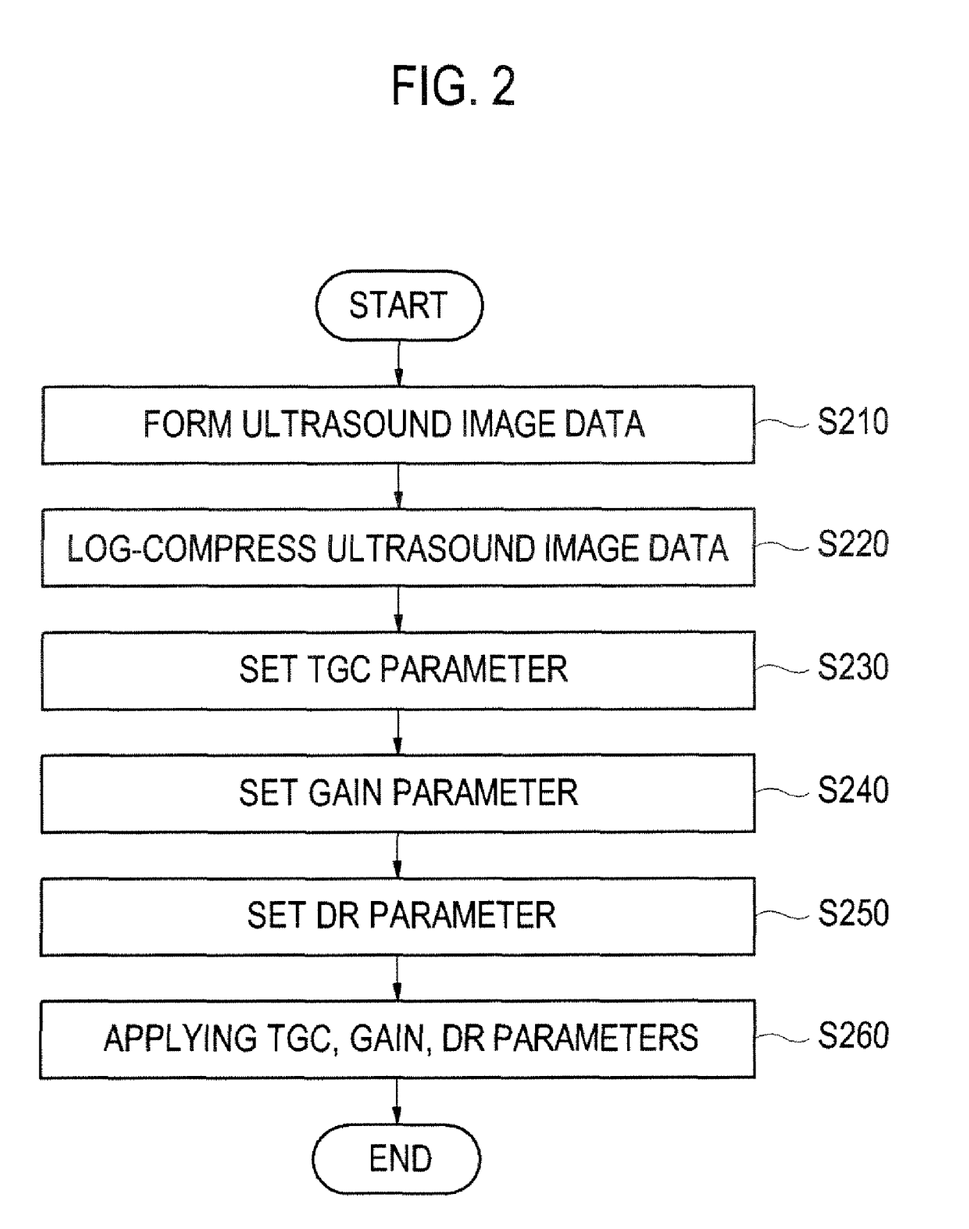
FIG. 2 is a flowchart illustrating a process for automatically enhancing the quality of an ultrasound image in accordance with an embodiment of the present invention.

The operation of the image parameter processor 190 will be described below in detail with reference to FIGS. 2 to 5. FIG. 2 is a flowchart illustrating the process for automatically enhancing the quality of an ultrasound image in accordance with an embodiment of the present invention.

Referring to FIG. 2, the image signal processor 140 forms the ultrasound image data based on the focused receive signals transmitted from the beam former 130 by applying the initial image parameters at step S210. The log compression processor 191 log-compresses the ultrasound image data received from the image signal processor 140 to provide a log-compressed ultrasound image at step S220. The TGC processor 192 automatically sets the TGC parameter of the log-compressed ultrasound image at step S230. The process for adjusting the TGC parameter according to the embodiment of the present invention will be described in detail with reference to FIG. 3. Subsequently, the gain processor 193 adjusts the gain parameter of the log-compressed ultrasound image applying the TGC parameter adjusted in the TGC processor 192 at step S240 and the DR processor 194 adjusts the DR parameter of the log-compressed ultrasound image applying the gain parameter adjusted in the gain processor 193 at step S250. The processes for adjusting the gain parameter and the DR parameter will be described in detail with reference to FIGS. 5 and 6. The image processor 160 applies the TCG, gain and DR parameters, which are automatically adjusted, to the ultrasound image. This is so that an enhanced ultrasound image can be obtained at step S260.

Figure 3:
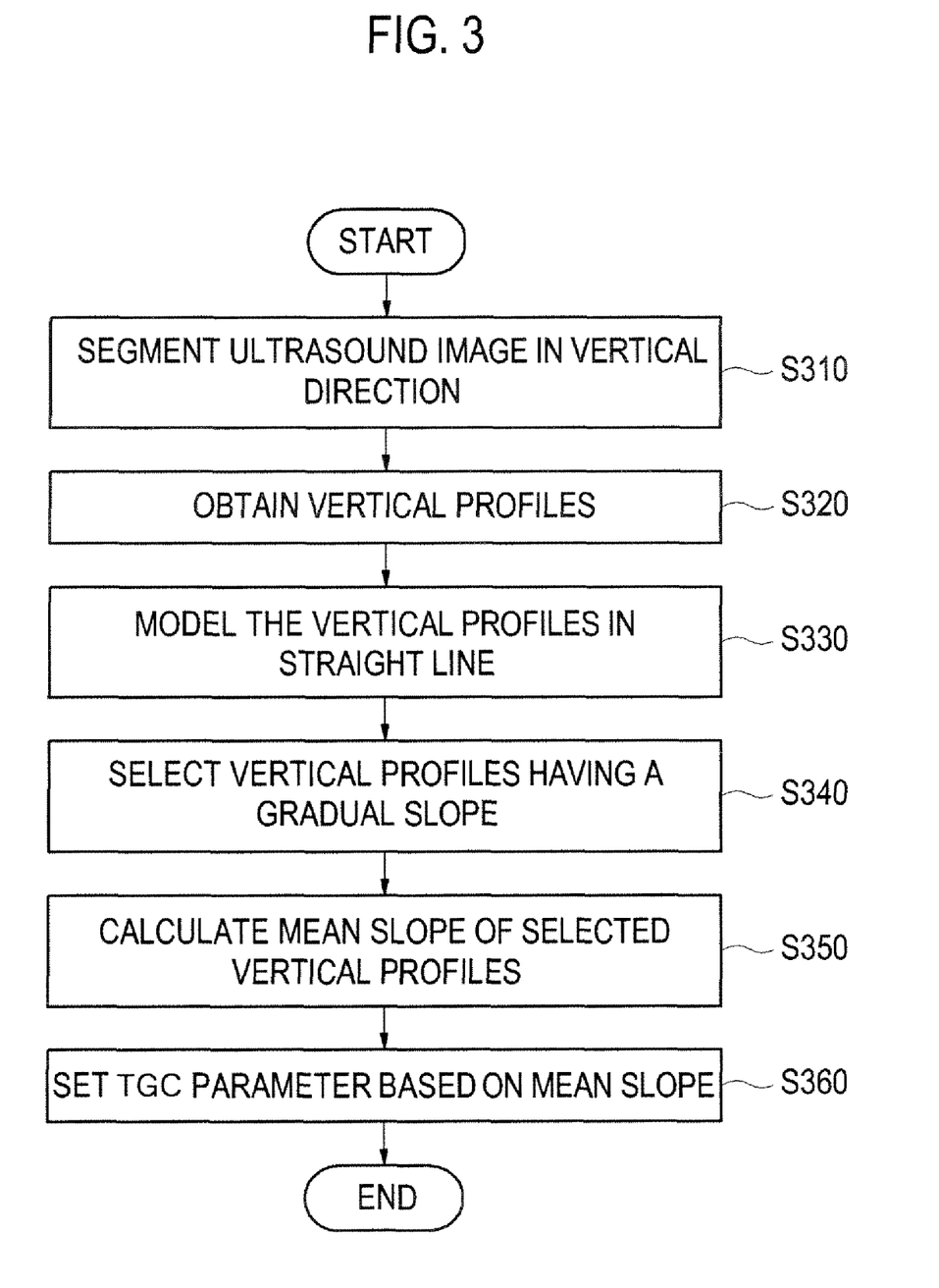
FIG. 3 is a flowchart illustrating a process for setting a TGC parameter in accordance with an embodiment of the present invention.

FIG. 3 is a flow chart illustrating the process for setting the TGC parameter according to an embodiment of the present invention. The TCG processor 192 segments the log-compressed ultrasound image into a plurality of image regions in a vertical direction at step S310. The TGC processor 192 detects the pixels positioned at the same depth in each segmented region and calculates the mean intensity of the detected pixels, thereby obtaining the vertical profiles of the pixel intensities in each segmented region at step S320.

Thereafter, the TGC processor 192 models the vertical profile in a straight line at step S330. The modeling of the vertical profile in a straight line may be carried out by one of various well-known methods such as a least square fit method or the like. In such a case, the slope of the vertical profile represents the brightness attenuation of the ultrasound image with depth. The TGC processor 192 analyzes the slope of the modeled vertical profile in each segmented region. Since the slope of the vertical profile is relatively steep in the dark regions of the ultrasound image, the TGC processor 192 selects a predetermined number of the vertical profiles having a gradual slope so as to exclude the vertical profiles corresponding to the dark regions at step S340. The TGC processor 192 calculates the mean slope of selected profiles and forms a representative straight line based on the calculated slope mean at step S350. The TGC processor 192 adjusts the TGC parameter of the ultrasound image based on the slope of the representative straight line, thereby setting an optimized TGC parameter at step S360.

Figure 4:
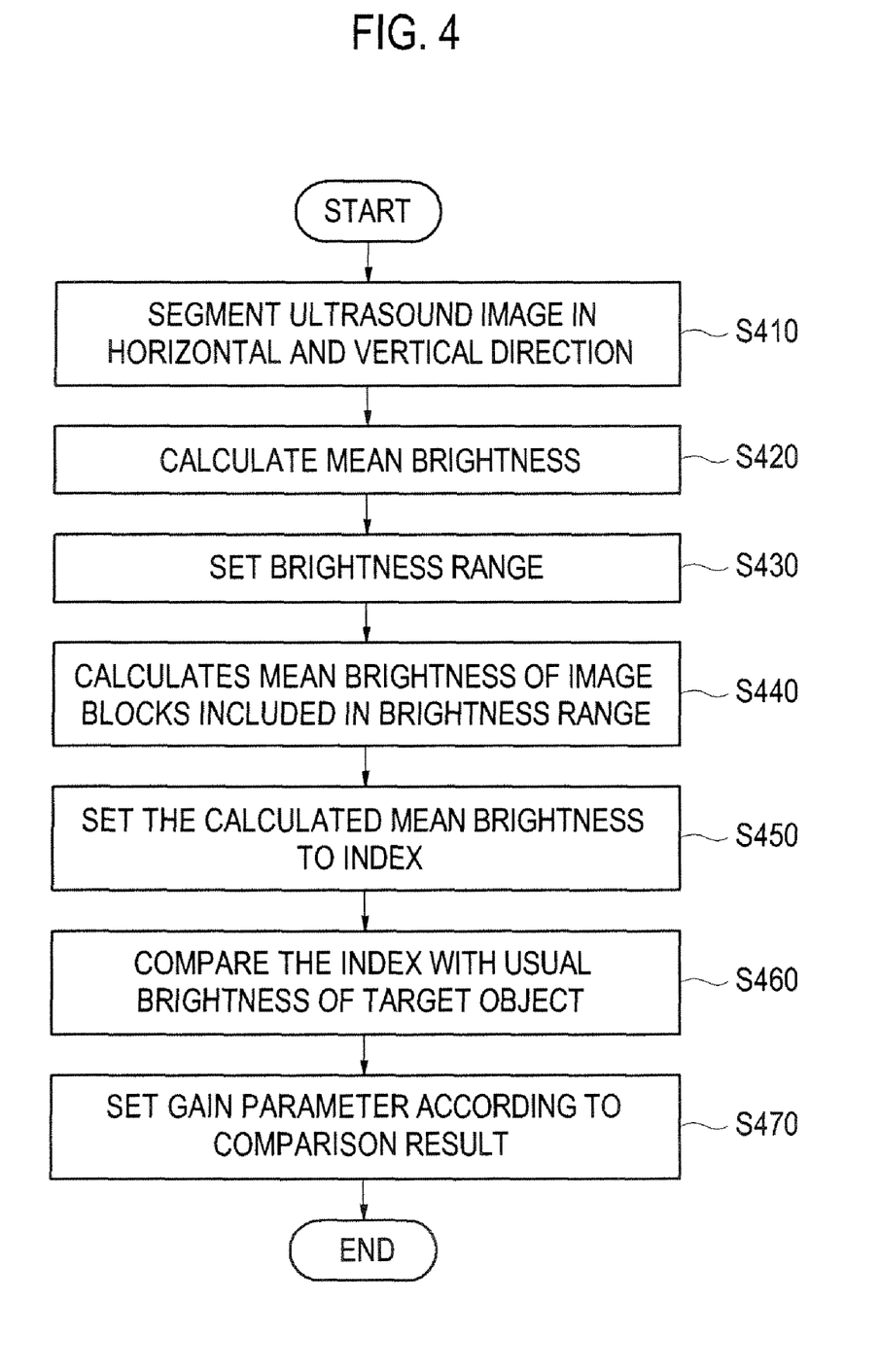
FIG. 4 is a flowchart illustrating a process for setting a gain parameter in accordance with an embodiment of the present invention.

The process for adjusting the gain parameter will be described below with reference with FIG. 4. The gain processor 193 segments the log-compressed ultrasound image to which the TGC parameter adjusted in the TGC processor 192 into a plurality of image blocks in horizontal and vertical directions at step S410. The gain processor 193 calculates the mean brightness of pixels existing in each image block at step S420. The gain processor 193 sets the brightness range of typical soft tissues and selects the image blocks, the mean brightness of which is within the set brightness range at step S430. The gain processor 193 calculates the mean brightness of the selected image blocks at step S440. The calculated mean brightness is set to an index representing the overall brightness of the ultrasound image at step S450. The gain processor 193 compares the index with typical brightness of a target object at step S460 and sets the gain parameter according to a comparison result at step S460.

Figure 5:
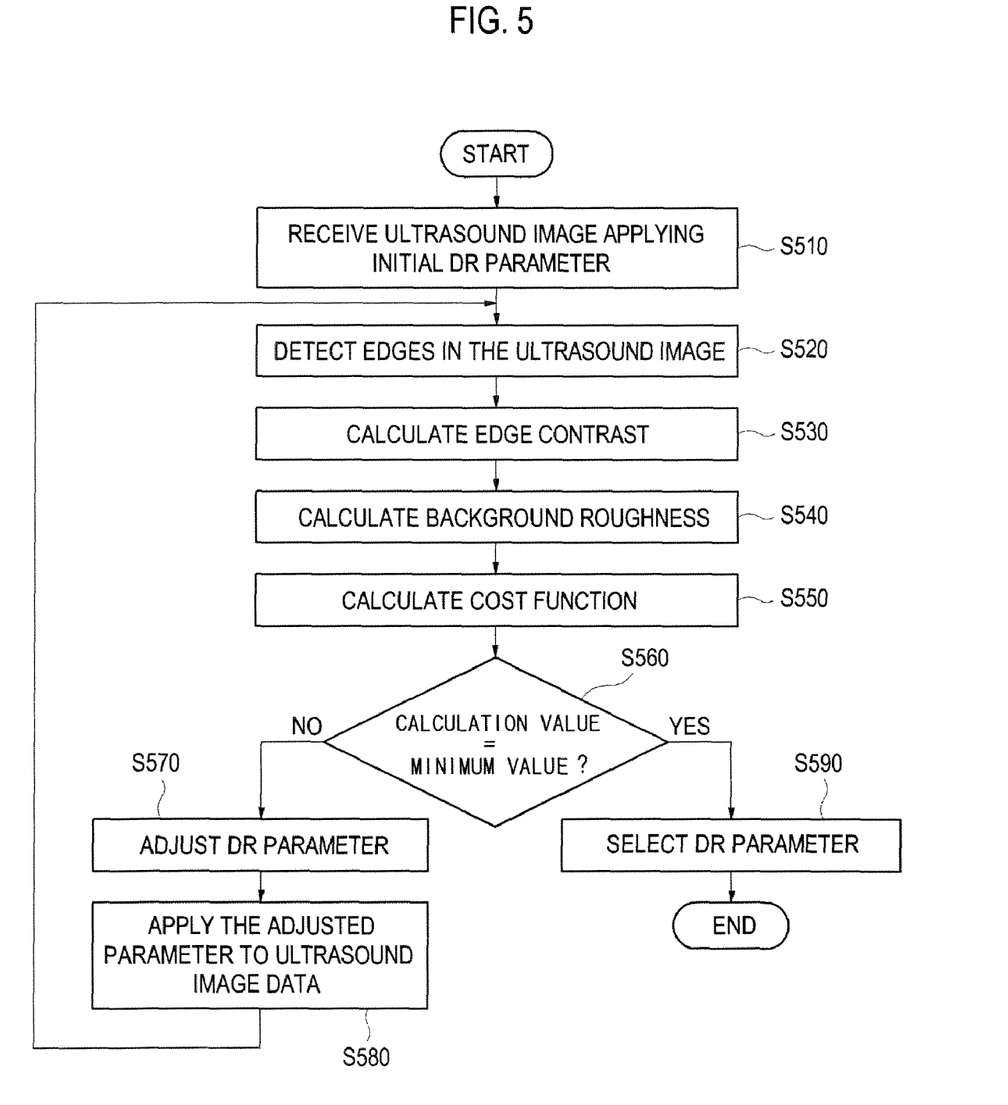
FIG. 5 is a flowchart illustrating a process for setting a DR parameter in accordance with an embodiment of the present invention.

FIG. 5 is a flowchart illustrating the process for adjusting the DR parameter in accordance with the embodiment. Referring to FIG. 5, the DR processor 194 receives the log-compressed ultrasound image to which the TGC parameter and the gain parameter adjusted in the TGC processor 192 and the gain processor 193, respectively, are applied at step S510 and detects edges therein at step S520. The edge detection may be carried out by eigen-analyzing a structure matrix formed with a gradient of pixels included in the ultrasound image. The DR processor 194 calculates the edge contrast at step S530. The edge contrast is defined by a difference of the mean of the pixel values between two regions separated by the edges within a window. In such a case, the window is set to pixels including the detected edges and neighboring pixels thereof. Also, the DR processor 194 calculates the background roughness at step S540. The background roughness is defined by a standard deviation of pixel intensities in regions excluding the edge regions of the ultrasound image. The DR processor 194 calculates the cost function at step S550. The cost function is defined as follows:

$$\text{Cost function} = \frac{1}{\text{Edge contrast}} + \text{background roughness} \quad (1)$$

Subsequently, the DR processor 194 checks whether a calculation result of the cost function is minimized at step S560. If it is determined that the resulting value of the cost function is minimized at step S560, then the DR processor 194 adjusts the DR parameter by a predetermined value at step S570 and the adjusted DR parameter is applied to the log-compressed ultrasound image data at step S580. The predetermined variable may be a positive value or a negative value. The predetermined variable is set so at that the calculation value of the cost function becomes small. Thereafter, the step goes to step S520. On the other hand, if it is determined that the calculation result is a minimum value, then the DR processor 194 selects a DR parameter applied to the ultrasound image when the cost function has a minimum calculation result. The selected DR parameter is determined as the optimized parameter at step S590.

In accordance with one embodiment of the present invention, the image parameters are adjusted based on I/Q (RF) data. Also, the image parameters can be adjusted based on scan-converted data in accordance with another embodiment of the present invention.

As mentioned above, the image parameters are automatically adjusted to obtain the desirable brightness and contrast of the ultrasound image in accordance with the present invention. This is so that the user can conveniently diagnose a patient with the optimized ultrasound image and the duration time for adjusting the image parameters can be reduced.

An image processing system and a method of enhancing the image quality of the ultrasound image are provided. The image processing system may include: an image data forming unit for forming image data based on image signals acquired from a target object; a log-compression unit for log-compressing the image data to provide a log-compressed image; a TGC processor for analyzing a vertical profile of pixel intensities in an image formed based on the log-compressed image data and automatically setting a TGC (time gain compensation) parameter of the image based on an analysis result; a gain processor for calculating a mean brightness of pixels included in the image and comparing the calculated mean brightness with a predetermined brightness to thereby automatically set a gain parameter of the log-compressed image applying the TGC parameter set in the TGC processor based on a comparison result; a DR processor for automatically setting a DR (dynamic range) parameter of the image by using an edge contrast and a background roughness of the log-compressed image applying the adjusted TGC and gain parameters; and an image forming unit for applying the TGC, gain and DR parameters to the image data.

The method of processing an image, comprises: a) forming image data based on image signals acquired from a target object; b) log-compressing the image data to provide a log-compressed image; c) analyzing a vertical profile of pixel intensities in the log-compressed image and automatically setting a TGC (time gain compensation) parameter based on the analysis result; d) calculating a mean brightness of pixels included in the log-compressed image applying the set TGC parameter and comparing the calculated mean brightness with a predetermined brightness to thereby automatically set a gain parameter based on a comparison result; e) setting a DR (dynamic range) parameter by using an edge contrast and a background roughness of the log-compressed image applying the set gain parameter; and f) applying the set TGC, gain and DR parameters to the image data.

Any reference in this specification to "one embodiment," "an embodiment," "example embodiment," etc., means that a particular feature, structure or characteristic described in connection with the embodiment is included in at least one embodiment of the invention. Such phrases in various places in the specification are not necessarily all referring to the same embodiment. Further, when a particular feature, structure or characteristic is described in connection with any embodiment, it is within the purview of one skilled in the art to effect such feature, structure or characteristic in connection with other ones of the embodiments.

Although embodiments have been described with reference to a number of illustrative embodiments thereof, it should be understood that numerous other modifications and embodiments can be devised by those skilled in the art that fall within the spirit and scope of the principles of this disclosure. More particularly, numerous variations and modifications are possible in the component parts and/or arrangements of the subject combination arrangement within the scope of the disclosure, the drawings and the appended claims. In addition to the variations and modifications in the component parts and/or arrangements, alternative uses will also be apparent to those skilled in the art.

What is claimed is:

1. An image processing system, comprising:
an image data forming unit configured to form image data based on image signals acquired from a target object by using initial image parameters including initial time gain compensation (TGC), initial gain and initial dynamic range (DR) parameters;
a log-compression unit configured to log-compress the image data to provide a log-compressed image;
a TGC processor configured to
vertically segment the log-compressed image into a plurality of image regions parallel to each other and calculate a mean pixel intensity at each depth of each of the image regions to compute a pixel intensity profile, and
model the pixel intensity profile in a straight line and automatically adjust the initial TGC parameter based on the modeled pixel intensity profile to apply the adjusted TGC parameter to the log-compressed image;
a gain processor configured to calculate a mean brightness of pixels included in the log-compressed image with the adjusted TGC parameter applied and compare the calculated mean brightness with a predetermined brightness to automatically adjust the initial gain parameter to apply the adjusted gain parameter to the log-compressed image;
a DR processor configured to automatically adjust the initial DR parameter by using an edge contrast and a background roughness of the log-compressed image with the adjusted TGC parameter and adjusted gain parameter applied; and
an image forming unit configured to apply the adjusted TGC parameter, adjusted gain parameter and adjusted DR parameter to the image data.

2. The image processing system of claim 1, wherein the image data are ultrasound image data.

3. The image processing system of claim 2, wherein the ultrasound image data are data before scan conversion.

4. The image processing system of claim 2, wherein the ultrasound image data are scan-converted data.

5. The image processing system of claim 1, wherein the TGC processor includes:
a unit configured to segment the log-compressed image into the plurality of image regions in a vertical direction;
a unit configured to detect pixels positioned at the same depth in each segmented image region and calculate a mean intensity of the detected pixels to thereby obtain the vertical profiles of pixel intensities in the respective image regions;
a unit configured to model the vertical profiles in a straight line;

a unit configured to form a representative straight line based on the modeled vertical profiles; and a unit configured to automatically adjust the initial TGC parameter based on a slope of the representative straight line.

6. The image processing system of claim 1, wherein the gain processor includes:

a unit configured to segment the log-compressed image with the adjusted TGC parameter applied into a plurality of image blocks in horizontal and vertical directions;

a unit configured to calculate a mean brightness of pixels existing in each image block;

a unit configured to set a predetermined range of pixel brightness and select image blocks, a mean brightness of which is within the predetermined range;

a unit configured to compare a mean brightness of pixels included in the selected image blocks with predetermined brightness; and a unit configured to automatically adjust the initial gain parameter according to a comparison result.

7. The image processing system of claim 1, wherein the DR processor includes:

a unit configured to detect edges in the log-compressed image with the adjusted TGC parameter and adjusted gain parameter applied;

a unit configured to calculate the edge contrast of the log-compressed image;

a unit configured to calculate the background roughness;

a unit configured to calculate a cost function defined by the edge contrast and the background roughness;

a unit configured to check whether a calculation result of the cost function is minimized;

a unit configured to adjust the initial DR parameter by a predetermined value when the calculation result is not minimized; and a unit configured to select a an adjusted DR parameter applied to the log-compressed image having a minimum calculation result of the cost function.

8. The image processing system of claim 7, wherein the cost function is defined as follows:

$$\text{Cost function} = \frac{1}{\text{Edge contrast}} + \text{background roughness}$$

9. A method of processing an image, comprising:

a) forming image data based on image signals acquired from a target object by using initial parameters including initial time gain compensation (TGC), initial gain and initial dynamic range (DR) parameters;

b) log-compressing the image data to provide a log-compressed image;

c) vertically segmenting the log-compressed image into a plurality of image regions parallel to each other, calculating a mean pixel intensity at each depth of each of the image regions to compute a pixel intensity profile, modeling the pixel intensity profile in a straight line and automatically adjusting the initial TGC parameter based on the modeled pixel intensity profile to apply the adjusted TGC parameter to the log-compressed image;

d) calculating a mean brightness of pixels included in the log-compressed image with the adjusted TGC parameter applied and comparing the calculated mean brightness with a predetermined brightness to automatically adjust the initial gain parameter based on a comparison result to apply the adjusted gain parameter to the log-compressed image;

e) adjusting the initial DR parameter by using an edge contrast and a background roughness of the log-compressed image with the adjusted TGC parameter and adjusted gain parameter applied; and f) applying the adjusted TGC parameter, adjusted gain parameter and adjusted DR parameter to the image data.

10. The method of claim 9, wherein the image data are ultrasound image data.

11. The method of claim 10, wherein the ultrasound image data are data before scan conversion.

12. The method of claim 10, wherein the ultrasound image data are scan-converted data.

13. The method of claim 9, wherein the step c) includes:

c1) detecting pixels positioned at the same depth in each image region and calculating a mean intensity of the detected pixels to thereby obtain vertical profiles of pixel intensities in the respective image regions;

c2) forming a representative straight line based on the modeled vertical profiles; and c3) automatically adjusting the initial TGC parameter based on a slope of the representative straight line.

14. The method of claim 9, wherein the step d) includes:

d1) segmenting the log-compressed image with the adjusted TGC parameter applied into a plurality of image blocks in horizontal and vertical directions;

d2) calculating a mean brightness of pixels existing in each image block;

d3) setting a predetermined range of pixel brightness and selecting image blocks, a mean brightness of which is within the predetermined range;

d4) comparing a mean brightness of pixels included in the selected image blocks with a predetermined brightness; and d5) automatically adjusting the initial gain parameter according to a comparison result.

15. The method of claim 9, wherein the step e) includes:

e1) detecting edges in the log-compressed image obtained by using the initial DR parameter;

e2) calculating the edge contrast of the log-compressed image;

e3) calculating the background roughness;

e4) calculating a cost function defined by the edge contrast and the background roughness;

e5) checking whether a calculation result of the cost function is minimized;

e6) adjusting the initial DR parameter when the calculation result from the checking step is not minimized; and e7) selecting an adjusted DR parameter applied to the log-compressed image having a minimum calculation result of the cost function.

16. The method of claim 15, wherein the cost function is defined as follows:

$$\text{Cost function} = \frac{1}{\text{Edge contrast}} + \text{background roughness}$$

* * * * *

UNITED STATES PATENT AND TRADEMARK OFFICE
CERTIFICATE OF CORRECTION

PATENT NO. : 7,833,159 B2
APPLICATION NO. : 11/562672
DATED : November 16, 2010
INVENTOR(S) : Chi Young Ahn et al.

Page 1 of 1

It is certified that error appears in the above-identified patent and that said Letters Patent is hereby corrected as shown below:

On the title page, Item (73), the 2$^{nd}$ Assignee's name is misspelled. Item (73) should read as follows:

-- (73) Assignees: Medison Co., Ltd., Hongchun-gun (KR); Korea Advanced Institute of Science and Technology, Daejeon (KR) --

Signed and Sealed this
Twenty-fifth Day of January, 2011

David J. Kappos
*Director of the United States Patent and Trademark Office*